Feb. 20, 1968   N. H. BRIGGS ET AL   3,369,401
TEMPERATURE-GRADIENT-INSENSITIVE RESISTANCE-TYPE
LIQUID METAL LEVEL DETECTOR
Filed Aug. 19, 1966

*INVENTORS.*
*Norman H. Briggs*
*Charles M. Burton*
*Glenn W. Greene*

BY

*ATTORNEY.*

United States Patent Office 3,369,401
Patented Feb. 20, 1968

3,369,401
TEMPERATURE-GRADIENT-INSENSITIVE RESIST-
ANCE-TYPE LIQUID METAL LEVEL DETECTOR
Norman H. Briggs, Oak Ridge, and Charles M. Burton
and Glenn W. Greene, Knoxville, Tenn., assignors to
the United States of America as represented by the
United States Atomic Energy Commission
Filed Aug. 19, 1966, Ser. No. 574,274
4 Claims. (Cl. 73—304)

The invention described herein was made in the course of, or under, a contract with the United States Atomic Energy Commission.

This invention relates to temperature gradient insensitive resistance type liquid metal level detectors and more particularly to a level indicator which compensates for the effect of voltages due to temperature gradients within the detector and thermoelectric voltages generated between the level detector and the liquid metal.

In the prior art, the liquid metal level detectors are submerged in the liquid metal and have often taken the form of an enclosing sheath with internal wires therein. These detectors, particularly D.C. excited units, may produce errors in measurement due to thermoelectric voltages generated between the sheath and the liquid metal from temperature gradients. Furthermore, temperature gradients within the detector produce a voltage proportional to the temperature. Thus, these temperature gradients may distort the detector output since the undesired voltages add to the level measuring output signal.

Applicants with a knowledge of the problems of the prior art have for an object of their invention the provision of a liquid metal level measuring system wherein at least two detector probes are submerged partially in the liquid and coupled in such a manner as to compensate for thermally-caused voltages and provide a signal which is a measure of true liquid level.

Applicants have as another object of their invention the provision of a D.C. liquid metal level indicator system that employs a pair of closely spaced twin probes for partial submersion in the liquid and coupled to eliminate thermoelectric generated signals while providing a signal corresponding to the true level of the liquid to be measured.

Applicants have as a further object of their invention the provision of a liquid level measuring system which eliminates the necessity for calibration, permits zero output at full level position, and provides increased sensitivity.

Other objects and advantages of our invention will appear from the following specification and accompanying drawings, and the novel features thereof will be particularly pointed out in the annexed claims.

Figure 1:
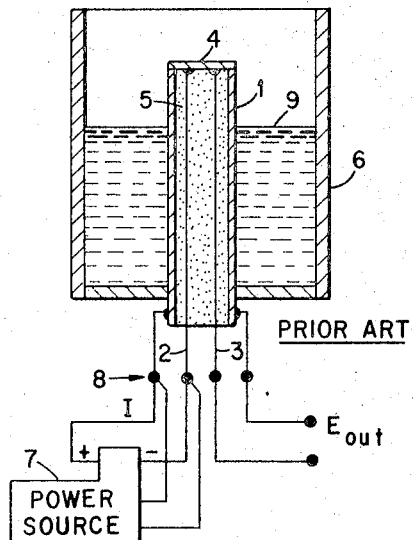
Figure 2:
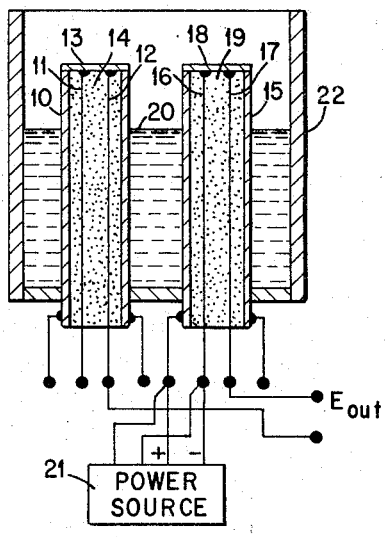
Figure 3:
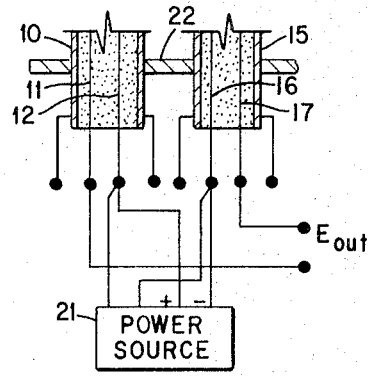
Figure 4:
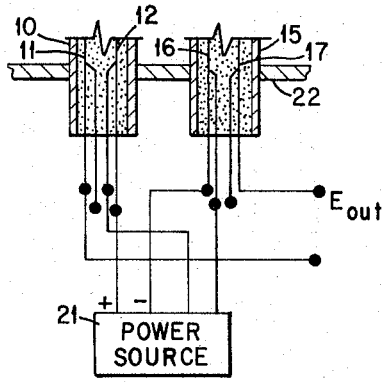

In the drawings, FIG. 1 is a sectional elevation of a prior art liquid level indicator with associated circuitry. FIG. 2 is a sectional elevation of our improved level detector and associated circuitry. FIG. 3 is a fragmental sectional view of the detector of FIG. 2 with modified circuitry. FIG. 4 is a fragmental sectional view of the detector of FIG. 2 with further modified circuitry.

Numerous devices have been utilized for measuring the level of liquid metal in vessels. Many of these have been immersion resistance-type which depend upon the variation of the resistance of the detector sheath as the liquid metal shorts a portion thereof. This is specifically exemplified by the level detector designated as an "I" probe, and shown in FIG. 1. This probe is fabricated from a tubular metal (e.g., S.S. or Inconel) sheath 1 having a pair of wires 2, 3 within the sheath with both joined to the closed end 4 of the sheath 1. The volume between the wires and sheath is filled with appropriate insulation 5. The detector is inserted through the bottom of a metal (e.g., Inconel or S.S.) vessel 6, and sealed thereto as by welding and/or brazing. The probe width used in this and subsequent figures has been exaggerated to more clearly illustrate internal structure.

A current, I, is caused to flow, as from a D.C. source 7 through sheath 1 and wire 2. Further, this D.C. source maintains the input voltage constant at junction 8 (voltage sensing wires shown). The current flow through the sheath 1, which has a certain resistivity, creates a voltage drop proportional to the length of sheath exposed above a molten metal surface 9. This voltage drop is monitored between wire 3 and sheath 1 and impressed upon appropriate recording means, as $E_{out}$. This output is inversely proportional to the liquid-metal level; as the liquid metal level rises, it shorts a portion of the sheath and reduces the voltage. When the level is at the top of the "I" probe, there is a minimum output which is dependent upon the length (resistance) of the sheath 1 of the "I" probe extending below the vessel 6. The exact magnitude of this minimum value (non-zero) is difficult to determine without an in situ calibration.

With the sheath 1 and the internal wires 2, 3 made of the same material, the ratio of their resistance remains unchanged with temperature; thus temperature compensation owing to resistance changes is inherently achieved at thermal equilibrium between the wires and sheath. However, with D.C. excitation, the output voltage may contain large errors caused by thermoelectric voltages (EMF's) generated between the sheath 1 and the liquid metal by temperature gradients existing either along the submerged portion of the sheath 1 or between the submerged portion of the sheath and the upright vessel wall 6. These thermoelectric EMF's are dependent both upon the liquid-metal level and the temperature gradient. The thermoelectric EMF's generated are effectively in series with the desired level output signal and therefore algebraically add to it. These thermoelectric EMF's may be measured at any time by interrupting the aforementioned current flow and the desired level signal can then be calculated.

The problems inherent in this prior art have been overcome by using two closely spaced "I" probes (twin-"I" probes), both identical in structure, connected in such a manner that the thermoelectric EMF is completely eliminated from the level signal. The first version of the twin-"I" probe is shown in FIG. 2 and two improved versions are shown in FIGS. 3 and 4. In FIG. 2, a voltage source 21 is connected between the sheath 15 and wire 16 to cause a current to flow through sheath 15. The voltage drop generated along the exposed portion of this sheath 15 is the desired output signal. The thermoelectric EMF's are generated as described above for the "I" probe shown in FIG. 1 along the submerged length of both of the sheaths 10, 15. By measurement made in a calibration facility, it was found that an equal but opposite thermoelectric EMF is generated along the inactive "I" probe sheath 10 which completely cancels that generated along sheath 15. The twin-"I" probe voltage output signal is still inversely proportional to level, and is linear. Most importantly, the output voltage is practically zero at maximum level. This feature permits an accurate prediction of the twin-"I" level element output vs. height of the liquid metal, and essentially eliminates the need for an in situ calibration of each probe.

An improved version of the twin-"I" probe was also tested. The same structure as that of FIG. 2 was used, together with the electrical connections shown in FIG. 3. In this configuration, there is no longer an inactive probe, such as in FIG. 2; the voltage drop along both sheaths 10, 15 above the liquid metal 20 is measured. As a result, twice the output voltage is obtained with the same current flow as the probe shown in FIG. 2. This provides greater sensitivity. For the same output voltage as obtained with the connections shown in FIG. 2, the twin-"I" probe connections of FIG. 3 require only one-half the input current. This will reduce problems that may be caused by internal heaating. The twin-"I" probe tested with either the FIG. 2 or the FIG. 3 connections gave a thirty mv. D.C. signal at zero level and 0.1 mv. D.C. output at the full length of the probe, fifteen inches.

In either of the twin-"I" probes shown in FIG. 2 or FIG. 3, there is, however, an inaccuracy due to changes in temperature (typically ±2% of the active length of the probe) caused by the portion of the wires 11, 12, 16, 17 in the sheaths 10, 15 which are below the bottom of vessel 22. Since the wire lengths below the vessel are in the electrical circuit and the sheath lengths are not, the automatic resistance ratio compensation with changes in temperature (stated above for the I probe) has been violated. This problem is overcome by the technique shown in FIG. 4. The D.C. power supply 21 voltage-sensing junctions, as well as the liquid level signal junctions, are made within the sheaths 10, 15 at the zero level position of the vessel 22. This will provide the automatic resistance ratio compensation since $$E_{out} = E_{in}(R_t/R_w)$$

where $R_t$ is the sheath wall resistance and $R_w$ is the wire resistance.

While the preferred embodiment of our invention utilizes a D.C. regulated voltage supply, the improved liquid level detector may be operated using an A.C. voltage and the voltage need not necessarily be highly regulated. When A.C. excited, there would not normally exist the problem of thermoelectric EMF's between the detector and the liquid metal. However, the other prior art deficiences would exist without the connections shown in FIGS. 2 through 4. If the voltage supply is non-regulated (A.C. or D.C.), the voltage sensing wires would not return to the voltage supply as shown, but would be connected to the readout system for compensation in any conventional manner as with a bridge circuit.

Having thus described our invention, we claim:

1. A device for continuously measuring the level of liquid metal in a vessel comprising a vessel for receiving a liquid metal, a pair of closely spaced probes disposed within the vessel and extending upwardly from the bottom thereof to a predetermined height above the bottom, each said probe including an outer shell and a plurality of conductors positioned within the shell and electrically jonied to the upper extremity of the shell, the outer shells of the pair of probes being composed of the same type of resistive material, a source of potential coupled to one of the conductors of each of said probes, and signal responsive means coupled to another one of said conductors of each of said probes whereby thermally created signals generated in the device are internally cancelled so as to provide an accurate indication of liquid level.

2. The device of claim 1 wherein the source of potential is connected to a conductor of each of said probes at the level of the bottom of said vessel, and the signal responsive means is connected to another conductor of each of said probes at the level of the bottom of said vessel.

3. The device of claim 1 wherein said source of potential is a D.C. regulated source of potential.

4. The device of claim 1 wherein said source of potential is a D.C. regulated source, and means for sensing the potential of said source for regulating it.

References Cited
UNITED STATES PATENTS 3,183,715  5/1965  Holmes _____ 73—304

LOUIS R. PRINCE, *Primary Examiner.*

D. O. WOODIEL, *Assistant Examiner.*